(12) United States Patent
Klyde et al.

(10) Patent No.: US 6,485,000 B1
(45) Date of Patent: Nov. 26, 2002

(54) DEVICE BY BALL VALVE

(76) Inventors: Ingolf Klyde, Ragvelen 42, N-4042, Hafrsfjord (NO); Erling Røyrvik, Hadlabrekko 38, N-5417, Stord (NO); Einar Saghaug, Slettestølsveien 12, N-5450, Sunde (NO)

(*) Notice: Subject to any disclaimer, the term of this patent is extended or adjusted under 35 U.S.C. 154(b) by 0 days.

(21) Appl. No.: 09/913,298
(22) PCT Filed: Jan. 12, 2000
(86) PCT No.: PCT/NO00/00007
§ 371 (c)(1), (2), (4) Date: Aug. 10, 2001
(87) PCT Pub. No.: WO00/50792
PCT Pub. Date: Aug. 31, 2000

(30) Foreign Application Priority Data

Feb. 11, 1999 (NO) .......................... 19990632

(51) Int. Cl.[7] .................. F16K 5/06; F16K 5/20
(52) U.S. Cl. ............... 251/315.07; 251/315.16; 251/314; 251/315.1
(58) Field of Search ............. 257/315.07, 315.1, 257/315.16, 314

(56) References Cited

U.S. PATENT DOCUMENTS

| | | | |
|---|---|---|---|
| 3,410,523 A | * 11/1968 | Kelly et al. ............. | 251/315.07 |
| 3,484,078 A | * 12/1969 | Haenky ...................... | 251/312 |
| 4,881,718 A | * 11/1989 | Champagne ............ | 251/315.16 |
| 5,305,988 A | * 4/1994 | Cox ........................... | 251/309 |
| 5,482,253 A | 1/1996 | Klyde | |

* cited by examiner

Primary Examiner—Henry C. Yuen
Assistant Examiner—John Bastianelli
(74) Attorney, Agent, or Firm—Proskauer Rose LLP

(57) ABSTRACT

A ball valve having a valve housing with an inlet and an outlet, a valve body with a bore and sealing bodies, and valve seats which are in sealing planes parallel to one another forming an oblique angle with the inlet and the outlet, and in which the sealing bodies are positioned in body planes parallel to one another, forming a similar oblique angle with the axis of the valve body.

10 Claims, 11 Drawing Sheets

DEVICE BY BALL VALVE

BACKGROUND OF THE INVENTION

The invention relates to a valve of the type in which there is arranged, within a valve housing, a valve body with a bore therethrough, and in which the valve body is rotatable about an axis of rotation perpendicular to the bore, and thereby can be rotated into a position in which the bore communicates with an inlet and an outlet of the valve housing. In the open position the inlet, the bore of the valve body and the outlet form the complete bore of the valve along a common valve axis. The valve is closed by rotating the valve body so that the longitudinal axis of the bore is transverse to the valve axis. The valve body then seals against the inlet, outlet or both the inlet and the outlet.

The valve type stated is characterized by the entire cross section of the bore being open when the valve is fully open. This allows, for example, cleaning pigs to be passed through a pipe line in which such valves are incorporated. Valves of this type may also be made with a reduced bore in the valve body.

Different embodiments of the valve type in question distinguish themselves from one another by the shape of the valve body and the sealing between the valve body and the inlet/outlet.

In so-called ball valves a ball-shaped valve body is used, sliding sealingly onto annular sealing surfaces of the valve housing, at the inlet and outlet, respectively. Each sealing surface is in a plane, the sealing plane, forming a right angle with the valve axis, and the two sealing planes are parallel. The contact pressure is determined by spring force, or hydraulically.

Another embodiment of the valve type described initially, is known from NO patent No. 170239, in which each sealing plane forms an oblique angle with the valve axis. At each sealing surface there is arranged, in the valve housing, a valve seat in the sealing plane. On two opposite sides the valve body is provided with annular sealing bodies in planes forming a corresponding, oblique angle with an axis which is perpendicular to the axis of rotation and typically also perpendicular to the bore of the rotational body. A sealing body is brought to bear sealingly on a valve seat, by rotation of the valve body about its axis of rotation. This embodiment has the advantage that the contact force between the sealing body and the valve seat is determined by the torque of the valve body. Another advantage is that a sealing can be achieved at both valve seats, i.e. both at the inlet and at the outlet, thereby ensuring closing of the valve. Moreover, the valve seals equally well in both flow directions.

One quality of this known construction is that positive pressure at the inlet/outlet provides a torque acting on the valve body, and seeks to rotate it towards its open position. The torque/opening torque increases with the inclination of the sealing plane and with the pressure. Therefore, for valves that are to be used by mean to high pressures, it is desirable for the smallest angle of the sealing plane to the valve axis to be as large as possible, i.e. as close to a right angle as possible.

Another quality of this known construction is that a positive pressure inside the valve housing provides a torque at the inlet/outlet, which acts on the valve body, seeking to rotate it towards the closed position. The torque/opening torque increases with the slope of the sealing plane and with the pressure.

If the cooperating sealing surfaces are positioned in the sealing plane, an undesired wedging effect arises between the sealing body and the valve seat. This can be avoided by increasing the slope of the sealing plane, i.e. by reducing the angle between the sealing plane and the valve axis, but, as mentioned, this requires a greater torque on the valve body in order to achieve sealing.

Another and better solution consists in forming the annular cooperating sealing surfaces of the valve seat and the sealing body so that they form a right angle with the sealing plane. In NO 170239 cooperating sealing surfaces are viewed in a plane section perpendicular to the axis of rotation of the valve body, and so that the valve axis is located in the plane of section. In the patent document, cooperating sealing surfaces are prescribed to follow a circle M with a radius R about a centre N at a distance from the axis S of rotation of the valve body. Thereby an angle is obtained between the sealing surfaces and the sealing plane, as mentioned. Transferred to a 3D valve seat and sealing body this means that the cooperating annular sealing surfaces form part of a ball surface (M) with a radius (R) and its centre at N.

It has turned out that a valve made in accordance with NO 170239 does not maintain tightness, except by moderate pressures. By elevated pressure a leak is created, typically where the distance to the axis of rotation of the valve body is the largest.

The object of the invention is to remedy said weaknesses, by a valve of the type known from NO 170239, and make such a valve usable for mean and higher pressures.

The object is realized through features as stated in the following specification and the subsequent claims.

SUMMARY OF THE INVENTION

The sealing problem by the valve type known from NO 170239 is assumed to be connected to the fact that the distance from the axis of rotation of the valve body to the cooperating contact surfaces varies because of said inclination of the sealing plane. When the valve body is rotated by a specific torque towards its closed position, a varying torque arm leads to a varying contact force along the contact surfaces, so that there will be the least contact force where the distance to the axis of rotation of the valve body is at its greatest. As the pressure is increased at the inlet/outlet, the valve housing and the valve body are deformed, and leaks occur in areas with least contact force between the cooperating contact surfaces.

According to the invention it is an essential feature that cooperating sealing surfaces have different curvatures. This is in contrast with the valve known from No 170239, in which is prescribed that both sealing surfaces follow the same circle or ball surface. Difference in curvature can be achieved by each sealing surface forming part of a ball surface of a different radius, one sealing surface forming part of a conical surface, while the cooperating sealing surface forms a part of a ball surface, part of a parabolic surface or part of a hyperbolic surface. An effect of this is that the contact between cooperating sealing surfaces is effective along a contact line instead of a contact surface when the valve body is subjected to a torque. If the torque is increased, the surface pressure rises strongly along the contact line. Where the contact force is the greatest, i.e. in the areas where the distance to the axis of rotation of the valve body is the smallest, the material in the valve seat and the sealing body is deformed, so that the contact surface increases. This leads, at the same time, to an greater contact force along other parts of the contact line.

One of the two cooperating contact surfaces may with advantage be made elastically resilient, so that a pretensional force is achieved because of the torque applied to the valve body in the closing. A resilient valve seat may, for example, be achieved by the implementation of a comparatively large extension in the longitudinal direction of the valve. In a preferred embodiment an elastically resilient gasket is positioned in a groove in the valve seat. The sealing body then comes to rest against the gasket. An elastically resilient valve seat or an elastically resilient gasket will compensate for the variation in contact pressure along the contact line and for changes in dimensions and shapes of the valve housing and valve body by increased pressure, temperature change, change in torque and external forces.

An inlet and an outlet of circular cross-sections are elliptical with respect to the sealing plane which forms an oblique angle with the valve axis. Therefore, the contact surfaces within the valve seat and the sealing body should, theoretically, constitute part of an elliptic cone surface, part of an elliptic parabola or an elliptic hyperbola. By a relatively small inclination of the sealing plane, i.e. when there is little angular deviation between the axis of symmetry and the bore axis, rotationally symmetric contact surfaces like a ball, cone, parabola or hyperbola, will make a sufficient approximation.

The axis of symmetry of the contact surfaces is perpendicular to the sealing plane and is positioned to the side of the axis of rotation of the valve body, as known in itself from NO 170239.

BRIEF DESCRIPTION OF THE DRAWINGS

The invention will be described in further detail by means of an exemplary embodiment, and reference is made to the accompanying drawings, in which.

DETAILED DESCRIPTION OF THE INVENTION

Figure 1:
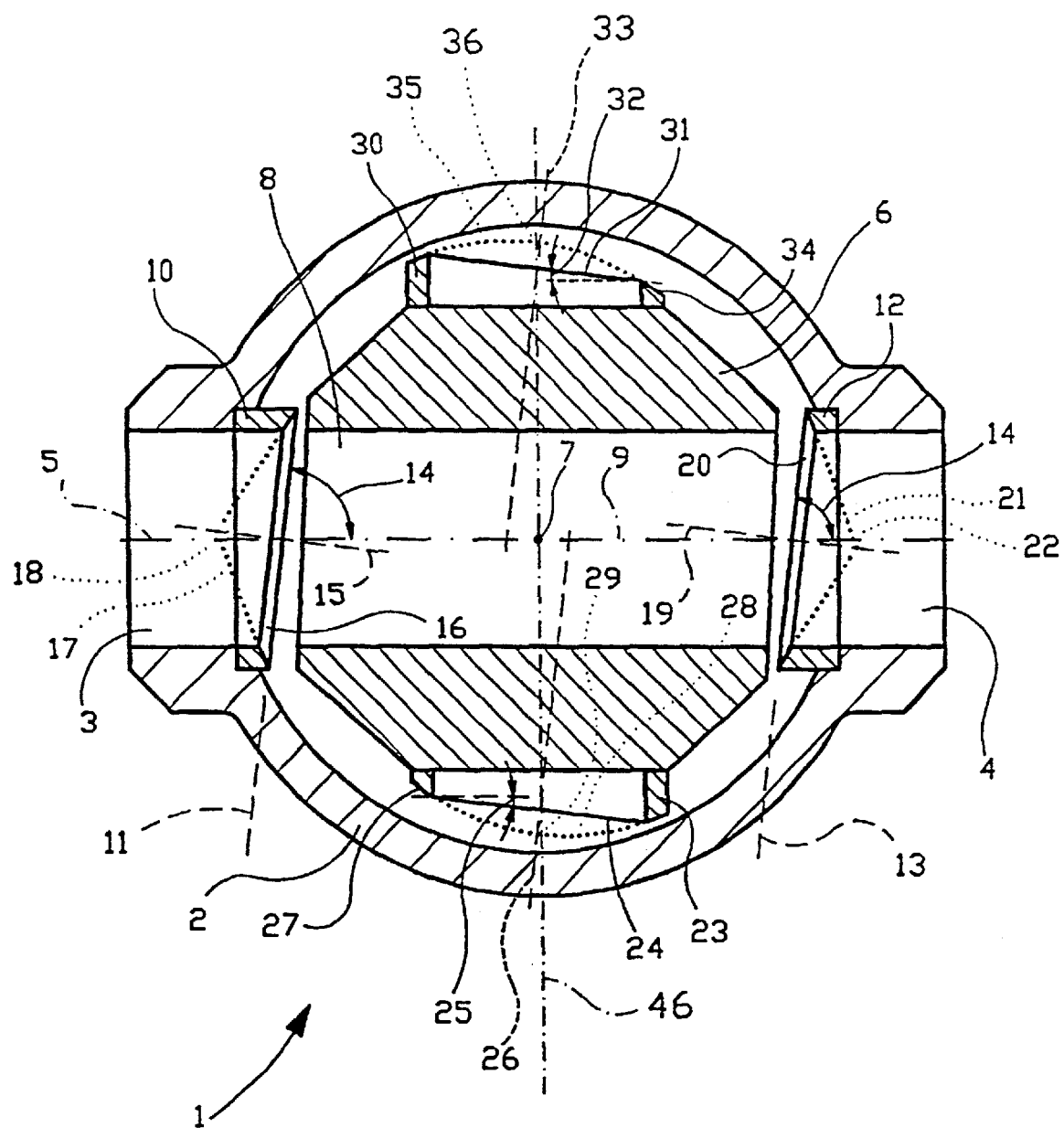
FIG. 1 shows, in a sectional view from above, a principle drawing of a fully open valve.
Figure 2:
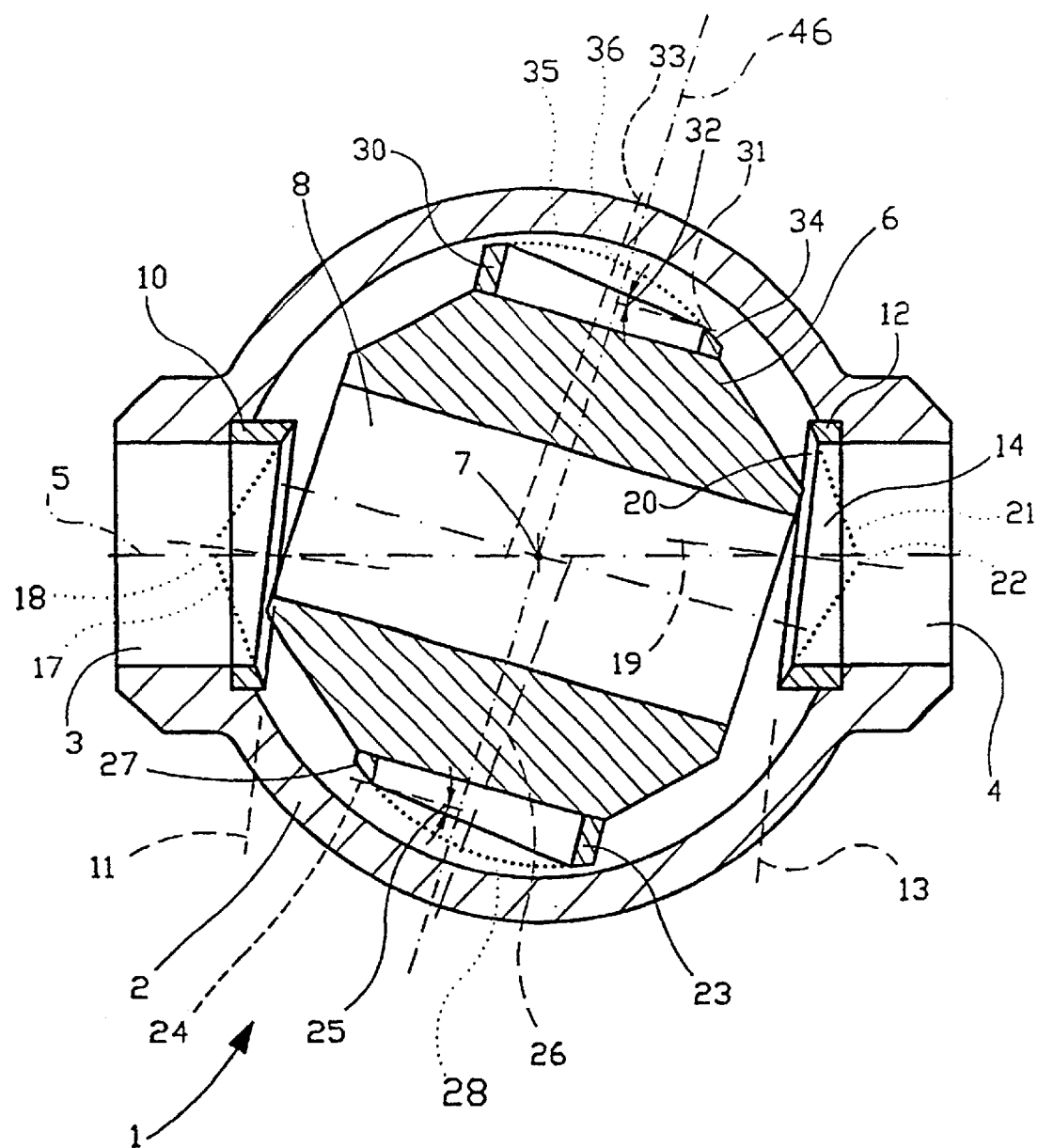
FIG. 2 shows the valve of FIG. 1, partially open.

In FIG. 1 reference numeral 1 defines a valve with a valve housing 2 which has an inlet 3 and a diametrically opposite outlet 4 along a common valve axis 5. Between the inlet 3 and the outlet 4 a valve body 6 is rotatably supported about an axis of rotation 7. The valve body 6 is provided with a bore 8 therethrough, with a bore axis 9 in the same plane as the valve axis 5 and perpendicular to the axis of rotation 7.

The valve body 6 is provided, in a known manner, with pins and is supported in the valve housing 2. Pins and bearings are not shown. In a known manner, one of the pins is passed pressure-tight out of the housing, and has a handle, an actuator or other means arranged thereto, arranged to rotate the valve body 6, but this arrangement is not shown either. However, it is well known to a person skilled in the art.

In the valve housing 2 is arranged, by the inlet 3, a first valve seat 10 with a first sealing plane 11, and by the outlet 4 is arranged, in a corresponding manner, a second valve seat 12 with a second sealing plane 13. The sealing planes 11, 13 are parallel to each other and form an oblique angle 14 with the valve axis 5. The first valve seat 10 is symmetrical or nearly symmetrical about a first axis of symmetry 15 which is perpendicular to the sealing plane 11.

The valve seat 10 is provided with a first annular sealing surface 16 forming an angle with the first sealing plane 11. The sealing surface 16 forms part of a first cone surface 17 belonging to a cone with its base in the sealing plane and apex 18 positioned on the axis of symmetry 15 of the valve seat 10, so that the cone apex is pointing away from the valve body 6.

The second valve seat 12 is correspondingly symmetrical about a second axis of symmetry 19 which is perpendicular to the sealing plane 13. The valve seat 12 is provided with a second annular sealing surface 20 forming an angle with the second sealing plane 13. The sealing surface 20 forms, in a manner corresponding to that of the first sealing surface 16, part of a second cone surface 21 of a cone with its base in the sealing plane and an apex 22 positioned on the axis of symmetry 19 of the valve seat 12, so that the cone apex is pointing away from the valve body 6.

On the one side of the valve body 6 is arranged a first annular sealing body 23 in a plane 24 which is parallel to the axis of rotation 7, and which forms, at the same time, an angle 25 with the bore axis 9, see FIG. 1. The angle 25 is complementary to the angle 14, i.e. the sum of the angles 14 and 25 is ninety degrees. The sealing body 23 is symmetrical or nearly symmetrical about a third axis of symmetry 26 which is perpendicular to the plane 24 of the sealing body 23.

The sealing body 23 is provided with a third annular sealing surface 27 forming an angle with the plane 24. The sealing surface 27 forms part of a first parabola 28 with its basis in the sealing plane 24 and an apex 29 positioned on the axis of symmetry 26 of the sealing surface 27, so that the parabola apex is pointing away from the valve body 6. The sealing surface 27 is arranged to cooperate with the sealing surface 16 of the valve seat 10.

On the other side of the valve body 6, diametrically opposite the first sealing body 23, is arranged a second annular sealing body 30 in a plane 31 which is parallel to the axis of rotation 7 and forms, at the same time, an angle 32 with the bore axis 9. The angle 32 is complementary to the angle 14, i.e. the sum of the angle 14 and the angle 32 is a right angle. The plane 31 is parallel to the plane 24. The sealing body 30 is symmetrical or nearly symmetrical about a fourth axis of symmetry 33 which is perpendicular to the plane 31 of the sealing body 30.

The sealing body 30 is provided with a fourth annular sealing surface 34 forming an angle with the plane 31. The sealing surface 34 forms part of a second parabola 35 with its basis in the sealing plane 31 and its apex 36 located on the axis of symmetry 33 of the sealing surface 34, so that the parabola apex is pointing away from the valve body 6. The sealing surface 34 is arranged to cooperate with the sealing surface 20 of the second valve seat 12. Contact points 45, FIG. 5, between the sealing surface 34 and the sealing surface 20 form a continuous contact line. The transverse axis 46 of the valve body 6 perpendicularly intersects the bore 8 of the valve body 6 and the axis of rotation 7.

Figure 3:
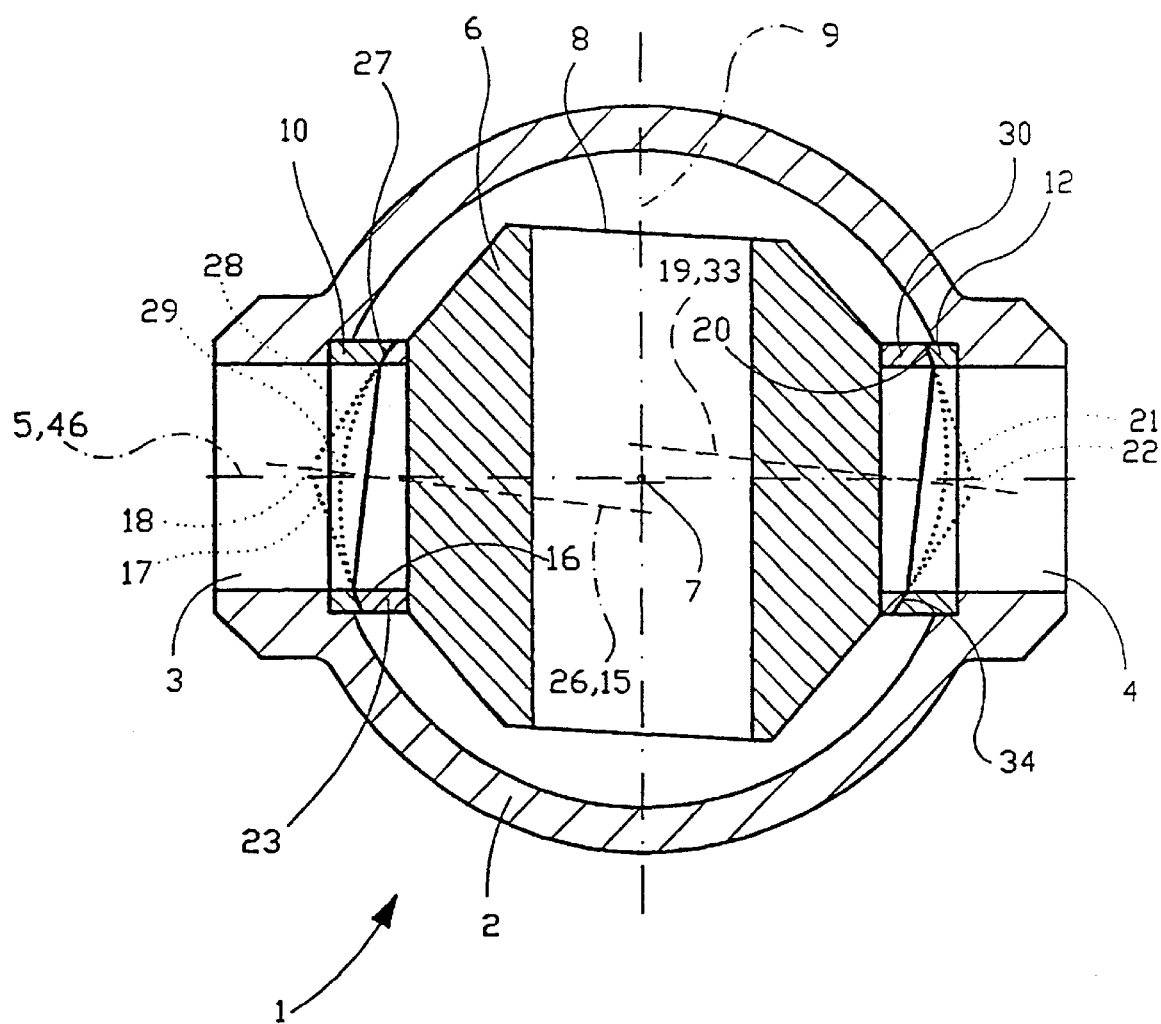
FIG. 3 shows the valve of FIG. 1, closed.

When the valve body 6 is in its closed position, see FIG. 3, the sealing surface 16 of the first valve seat cooperates with the sealing surface 27 of the first sealing body 23, while, at the same time, the sealing surface 20 of the second valve seat 12 cooperates with the sealing surface 34 of the sealing body 30.

By closed valve, see FIG. 3, a positive pressure in the inlet 3 and the outlet 4 relative to the pressure inside the valve housing 2, will give a resultant force acting along the axes of symmetry 15, 19, and a resultant torque about the axis of rotation 7 seeking to rotate the valve body 6 towards the open position. By closed valve a positive pressure inside the valve housing 2 will correspondingly provide a torque which seeks to rotate the valve body 6 towards its closed position.

Figure 5:
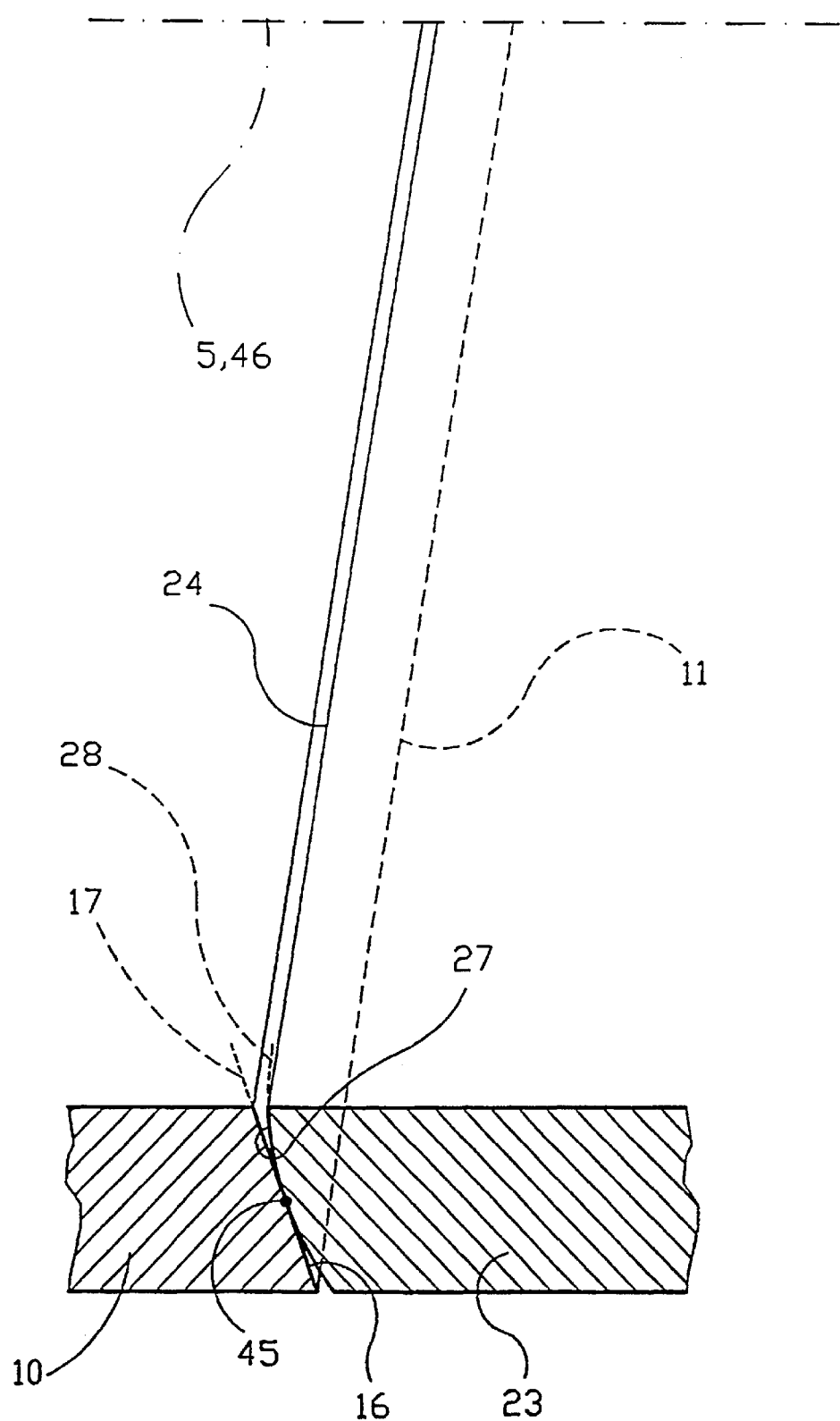
FIG. 5 shows on a still larger scale, part of the cooperating sealing surfaces of FIG. 4.

In FIG. 5 is shown how different curvatures of the first sealing surface 16 and the cooperating third sealing surface 27 lead to the sealing surfaces only touching each other at a contact point 45. The contact points between the first sealing surface 16 and the third sealing surface 27 together form a contact line. There will be a corresponding situation by the sealing surface 20. In the closed position the valve axis 5 coincides with the axis 46 of the valve body 6.

Figure 4:
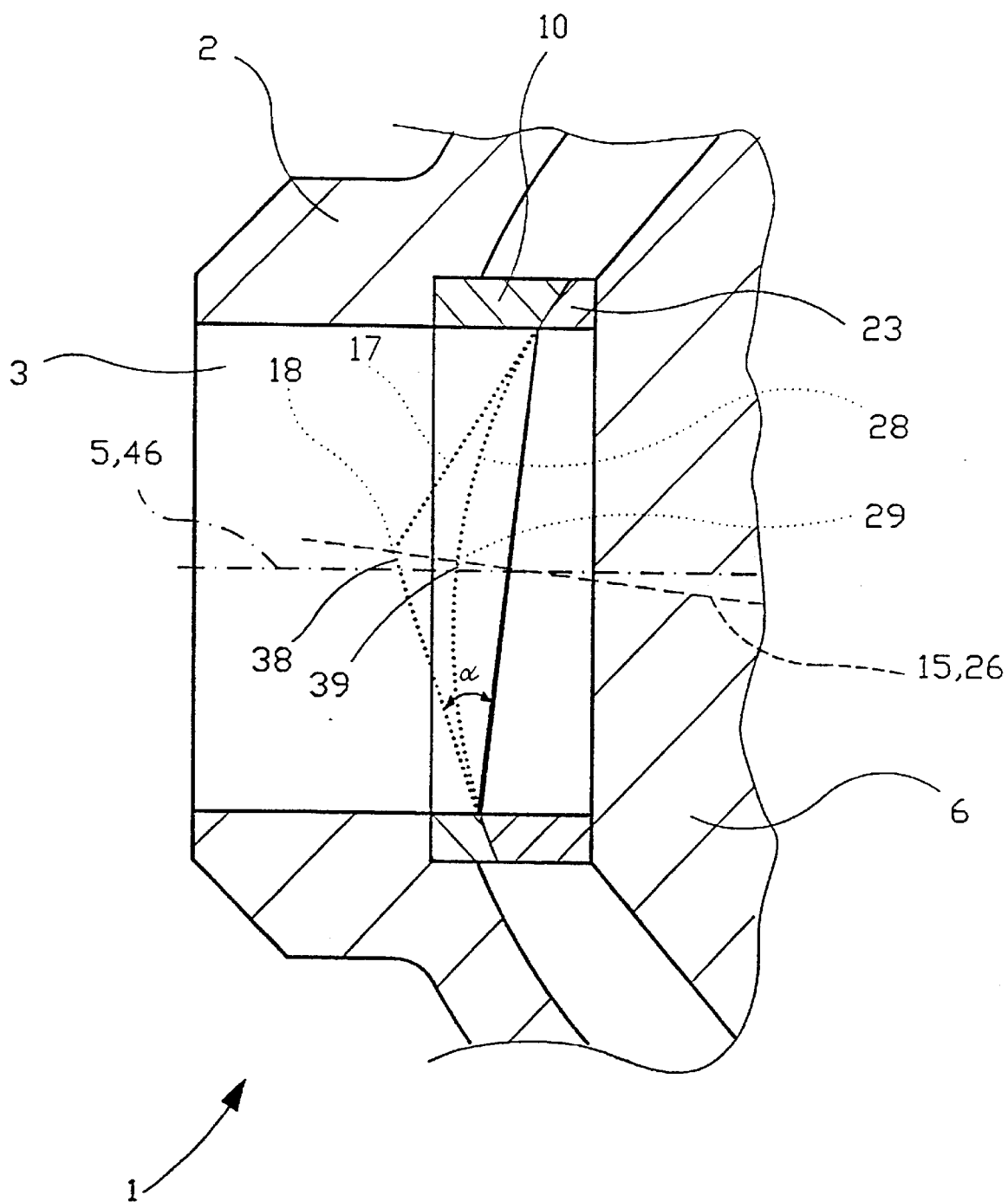
FIG. 4 shows, on a larger scale, the area of the first valve seat by closed valve.
Figure 8:
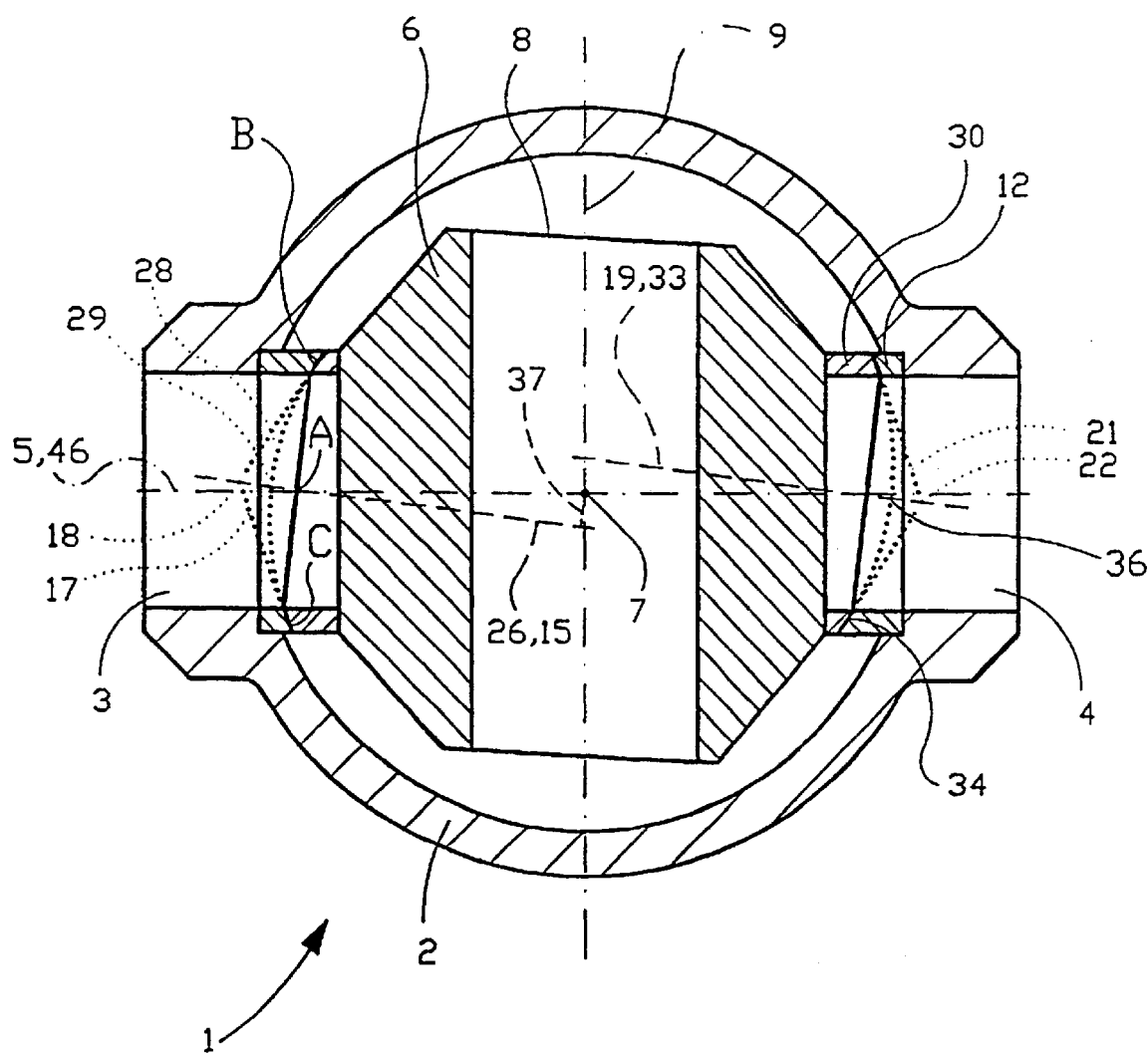
FIG. 8 shows the same as FIG. 3, with indication of some contact points between cooperating sealing surfaces.

The valve can be called tipple-eccentric and double-sealing, reference being made to the FIGS. 3, 4, and 8. The shortest distance between the axes of symmetry 15, 19, 26, 33, and the axis of rotation 7 is called the first eccentricity 37 of the valve. The shortest distance between the apexes 18, 22 and the valve axis 5 is called the second eccentricity 38 of the valve. The shortest distance between the apexes 29, 36 and the valve axis 5 is called the third eccentricity 39 of the valve.

Figure 6:
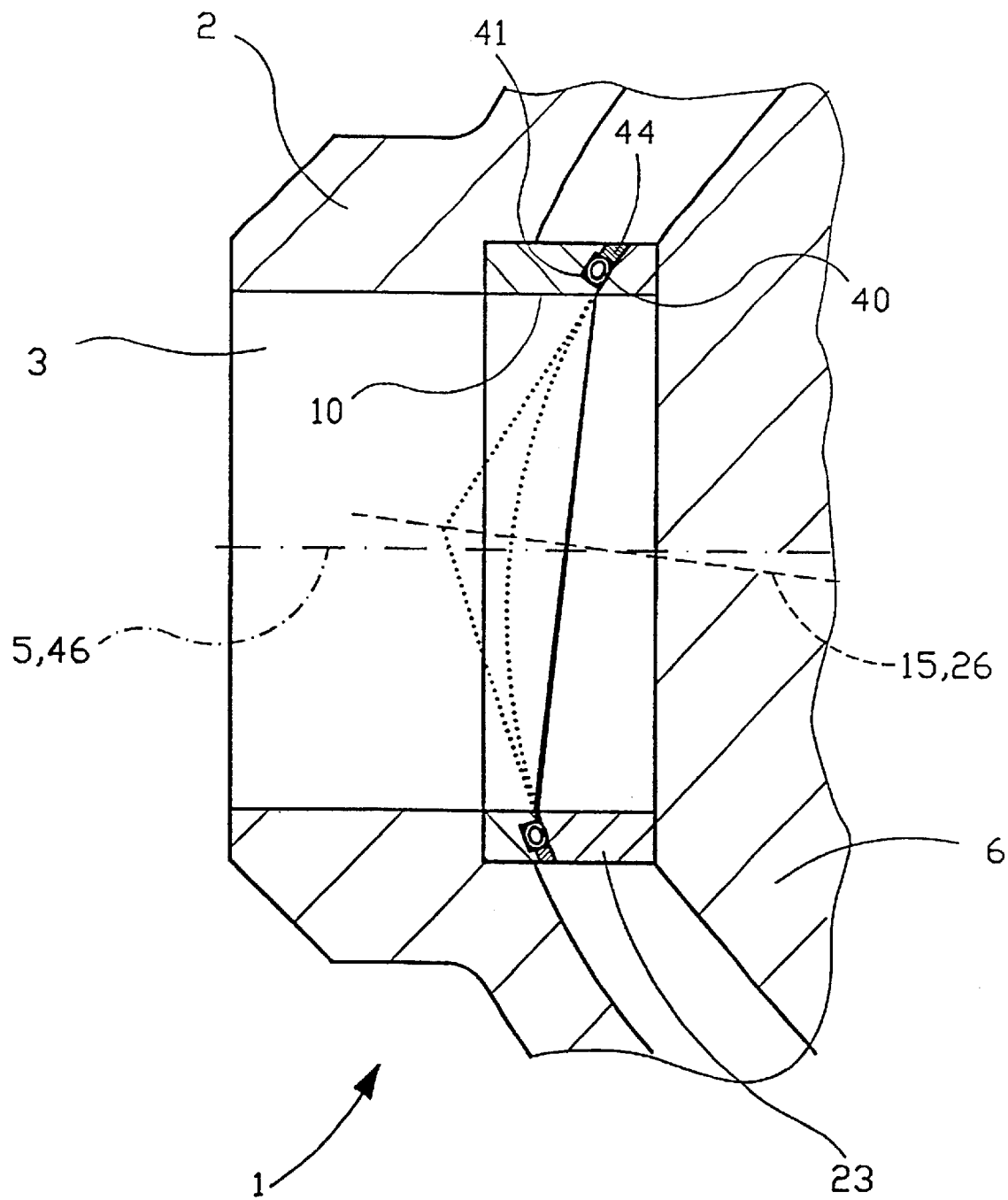
FIG. 6 shows, on the same scale as FIG. 4, the area by the first valve seat with a gasket.
Figure 7:
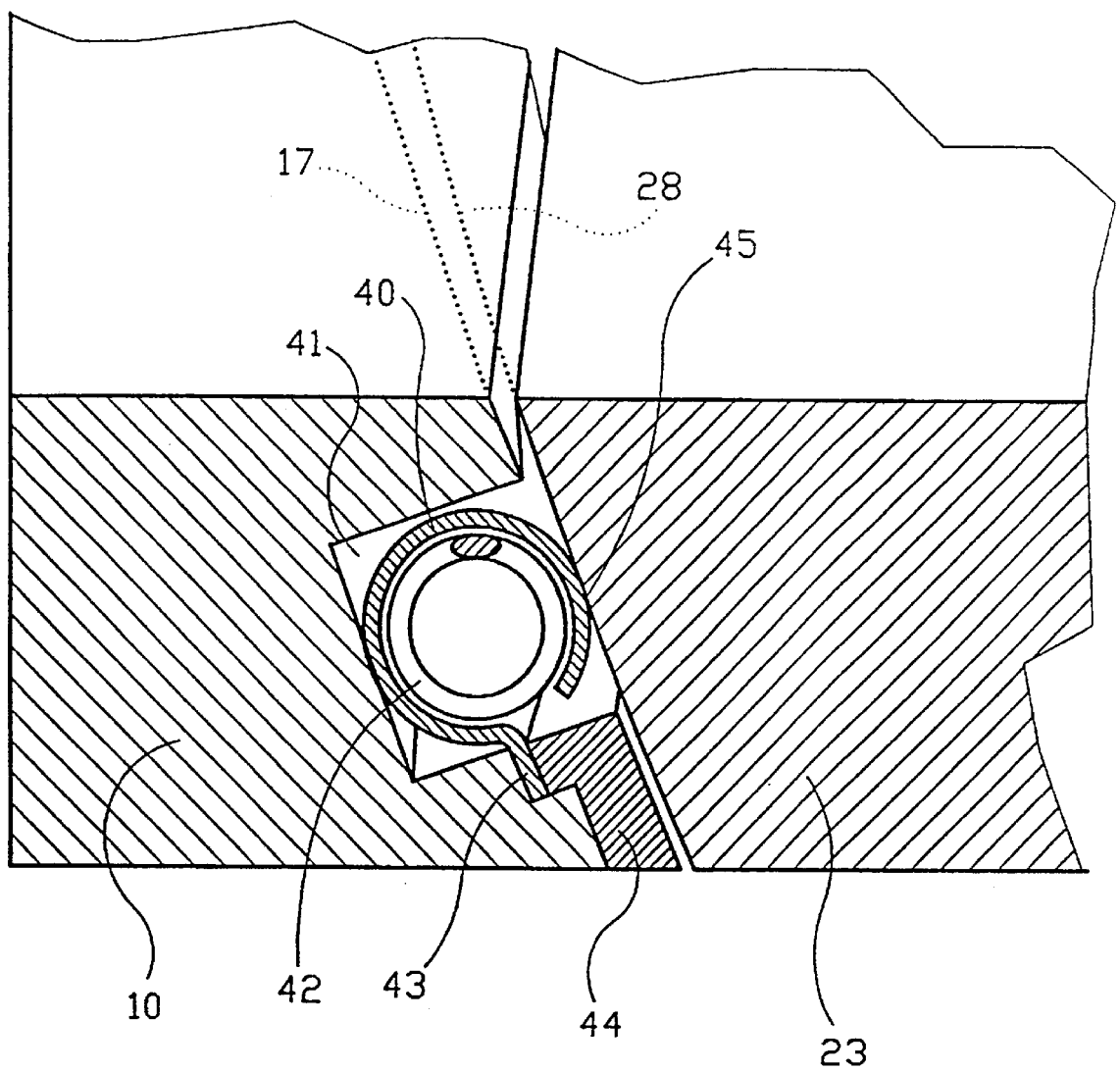
FIG. 7 shows, on a larger scale, details by the gasket.

Further, reference is made to FIGS. 6 and 7, in which a flexible gasket 40 is arranged in an annular groove 41 in the first valve seat 10. A gasket may be arranged in a corresponding manner in the second valve seat 12, but this is not shown. A preferred gasket 40 of a type known in itself, in which the gasket material is shaped as, for example, a hollow ring with a longitudinal slot. The slot allows the gasket 40 to be compressed, so that a continuous contact line is formed. For the gasket 40 to obtain sufficient resilience, a helical spring 42 has been inserted into the cavity of the gasket 40. The gasket 40 is provided with an external collar 43. A clamping ring 44, which is secured to the valve seat 10 with screws not shown, presses the collar 43 against the valve seat 10 and keeps the gasket 40 in position in the groove 41. Further, reference is made to FIG. 7 which shows a cross-section of the ring on a larger scale;

Alternatively the flexible gasket 40 can be arranged in the sealing bodies 23, 30. This is not shown.

As mentioned initially, a torque applied to the valve body 6, will result in a contact force between the cooperating sealing surfaces 16 and 27, and between the cooperating sealing surfaces 20 and 34. The contact force at each contact point 45 is dependent on the distance from the contact point 45 to the axis of rotation 7 of the valve body 6.

In FIG. 8 are indicated three contact points A, B and C. Of these, the contact point A is the closest to the axis of rotation, and therefore the contact force will be the greatest at A. The contact point C is farthest from the axis of rotation 7 and therefore the contact force is the weakest in C. The contact point B is at a slightly larger distance than the contact point A from the axis of rotation 7, but considerably closer to the axis of rotation 7 than the contact point C. The contact force at B is therefore smaller than the contact force at A, but greater than the contact force at C.

Figure 9:
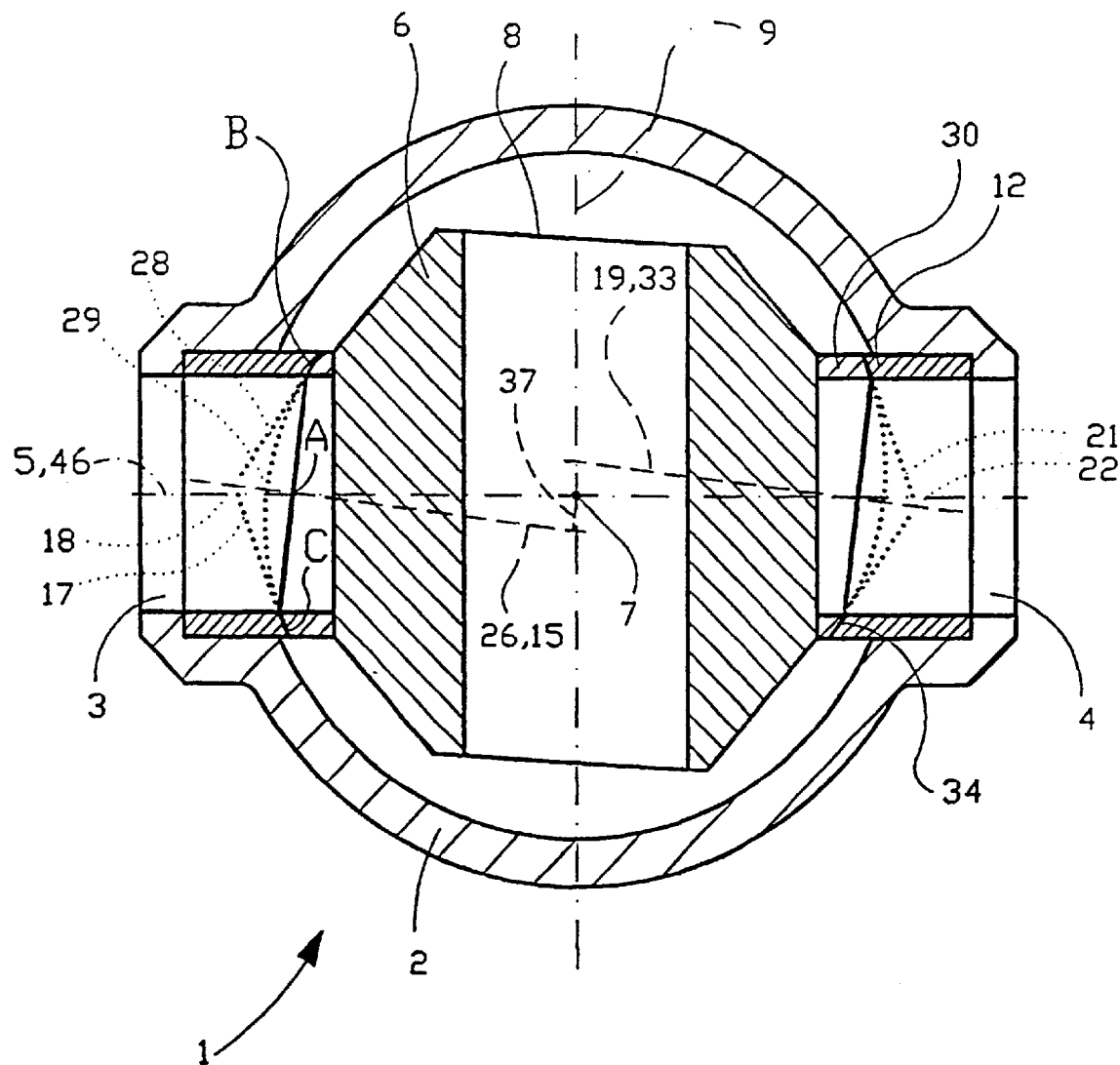
FIG. 9 shows the same as FIG. 3, but with lengthened valve seats.

The contact force between the cooperating sealing surfaces 16, 27 and 20, 34 results in the valve seat 10, 12 being compressed lengthwise. By deformation and dimensional changes resulting from pressure, temperature, torque and other external forces that the valve 1 is exposed to, the compression will vary and thus absorb the changes without the contact force becoming too weak for sealing to be achieved. As the specific compression of metal is small, the valve seats 10, 12 can be lengthened to achieve a greater total compression, as a larger length will provide a smaller spring constant, see FIG. 9.

Figure 10:
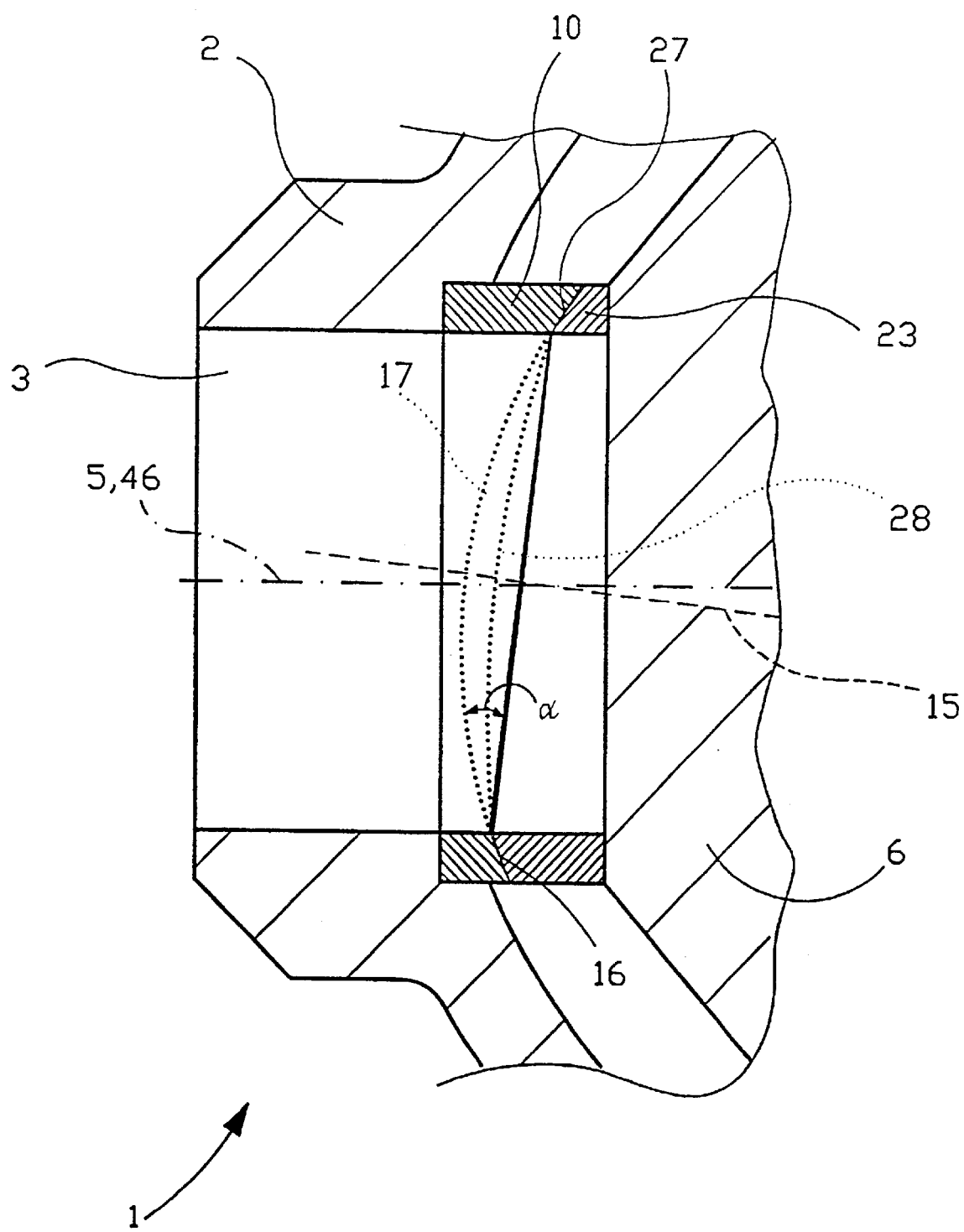
FIG. 10 shows the same as FIG. 4, with an alternative embodiment of cooperating sealing surfaces.

FIG. 10 shows an alternative embodiment of the first valve seat 10, in which the angle α varies along the sealing surface 16. Here, the sealing surface 16 does not constitute part of an imaginary cone surface as described, but is made up of parts of innumerable imaginary cone surfaces, in which each imaginary cone is of a different height, varying within a lowest and highest value. Thus, the angle a is at its smallest in the area where the distance to the axis of rotation 7 is the largest.

Figure 11:
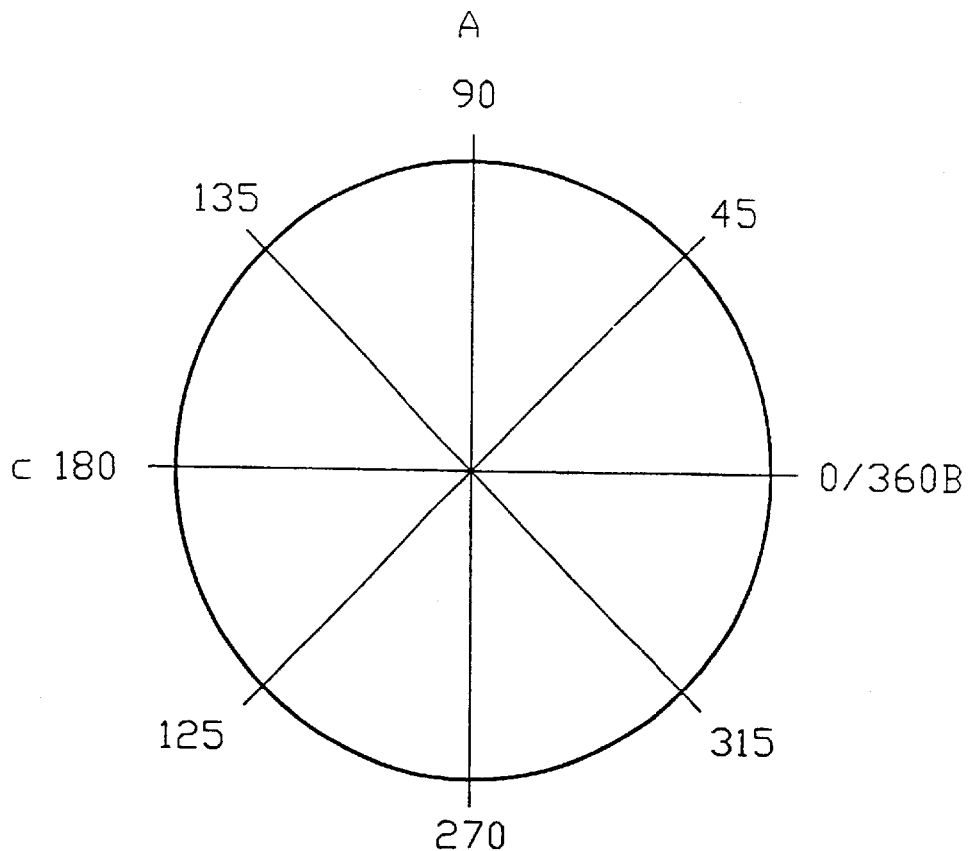
FIG. 11 shows a diagram with values of angles of positions marked along an imaginary line of contact between the cooperating sealing surfaces of FIG. 10.
Figure 12:
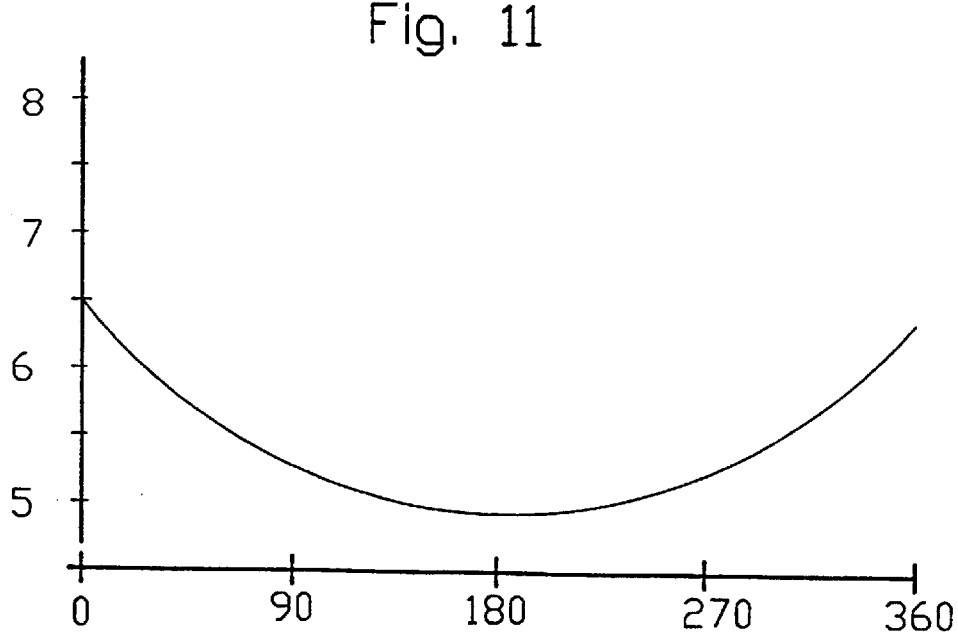
FIG. 12 shows a graphical representation of the angle of the seat surface relative to the seat plane, as a function of the angles of positions in FIG. 11.

FIG. 11 shows a circular contact line between cooperating sealing surfaces, seen from the center of the valve 1 towards the inlet 3. Grade figures are indicated for a polar angle of contact points along the contact line, and the contact points A, B, and C are indicated. The curve in FIG. 12 shows schematically the angle a as a function of the polar angle.

What is claimed is:

1. A valve comprising:

a valve housing comprising an inlet and an outlet having a common center line along a valve axis, the valve housing further comprising a valve body having a bore therethrough, the valve body being rotatably arranged about an axis of rotation perpendicular to the bore and arranged rotatably between a first position, in which the bore communicates with the inlet and the outlet, and a second position, in which first and second sealing bodies of the valve body seal against first and second valve seats by the inlet and the outlet of the valve housing, the valve seats being sealing planes arranged parallel to each other forming a first oblique angle with the inlet, the outlet and the common center line, the sealing bodies arranged in body planes parallel to each other forming a second oblique angle with a transverse axis of the valve body, wherein the valve seats and the sealing bodies include cooperating, annular sealing surfaces about their respective axes of symmetry perpendicular to the respective sealing planes and body planes, the sealing surfaces being curved and forming a third oblique angle a with their respective sealing planes and body planes, and wherein, the cooperating sealing surfaces have varying curvatures.

2. A valve according to claim 1, wherein the cooperating sealing surfaces come into contact along contact points forming contact lines and define three eccentricities, wherein a first eccentricity is the a shortest distance between the axes of symmetry and the axis of rotation of the valve body, a second eccentricity is a shortest distance between a first apex, the first apex being an imaginary extension of the sealing surface intersecting the axes of symmetry of the valves axis, and a third eccentricity is the shortest distance between a second apex, the second apex being an imaginary extension of the sealing surfaces intersecting the axis of symmetry of the valve axis and an axis of the valve body which coincide when the valve is in a closed position.

3. A valve according to claim 2, wherein the curvature of one of the cooperating sealing surfaces of the valve seat is infinite thereby forming part of a cone surface.

4. A valve according to claim 2, wherein the cooperating sealing surfaces form part of a parabola surface.

5. A valve according to claim 2, wherein the cooperating sealing surfaces form part of a ball surface.

6. A valve according to claim 2, wherein one of the sealing surfaces curves in an opposite direction from a respective cooperative sealing surface.

7. A valve according to claim 2, wherein one of the cooperating sealing surfaces is an elastic gasket.

8. A valve according to claim 1, wherein the third oblique angle a varies along the sealing surfaces.

9. A valve according to claim 8, wherein the third oblique angle a is largest when a distance from one of the sealing surfaces to the axis of rotation is largest.

10. A valve according to claim 1, wherein the sealing surfaces are rotationally symmetrical when a small angle is used between the axes of symmetry of the sealing surfaces and the valve axis/transverse axis when the valve is in a closed position.

* * * * *